(12) United States Patent
Venkatasubba et al.

(10) Patent No.: US 10,372,639 B2
(45) Date of Patent: *Aug. 6, 2019

(54) SYSTEM AND METHOD TO AVOID SMBUS ADDRESS CONFLICTS VIA A BASEBOARD MANAGEMENT CONTROLLER

(71) Applicant: DELL PRODUCTS, LP, Round Rock, TX (US)

(72) Inventors: Karthik Venkatasubba, Bangalore (IN); Elie A. Jreij, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/937,174

(22) Filed: Mar. 27, 2018

(65) Prior Publication Data

US 2018/0210850 A1 Jul. 26, 2018

Related U.S. Application Data

(63) Continuation of application No. 14/658,553, filed on Mar. 16, 2015, now Pat. No. 9,940,275.

(51) Int. Cl.
*G06F 13/00* (2006.01)
*G06F 13/362* (2006.01)
*G06F 13/40* (2006.01)

(52) U.S. Cl.
CPC ........ *G06F 13/362* (2013.01); *G06F 13/4068* (2013.01)

(58) Field of Classification Search
CPC ......... G06F 2213/0016; G06F 13/4282; G06F 2213/0052

See application file for complete search history.

(56) References Cited

U.S. PATENT DOCUMENTS

| | | |
|---|---|---|
| 6,728,793 B1 | 4/2004 | McRobert et al. |
| 7,603,498 B2 | 10/2009 | Bishnoi et al. |
| 7,685,477 B2 | 3/2010 | Sauber et al. |
| 8,386,657 B2 | 2/2013 | Adkins et al. |
| 2007/0088816 A1 | 4/2007 | Hrustemovic et al. |
| 2011/0296067 A1 | 12/2011 | Weidenkeller |
| 2013/0132628 A1 | 5/2013 | Li et al. |

*Primary Examiner* — Idriss N Alrobaye
*Assistant Examiner* — Richard B Franklin
(74) *Attorney, Agent, or Firm* — Larson Newman, LLP

(57) ABSTRACT

An information handling system includes an Inter-Integrated Circuit (I2C) master device and an I2C slave device coupled to the I2C master device via an I2C bus. The I2C slave device is configured with a pre-set I2C address and includes seeding data that is unique to the I2C slave device. The I2C master device receives the seeding data and addresses the I2C slave device at an I2C slave address instead of at the pre-set I2C address, wherein the I2C slave address is based upon the seeding data.

20 Claims, 5 Drawing Sheets

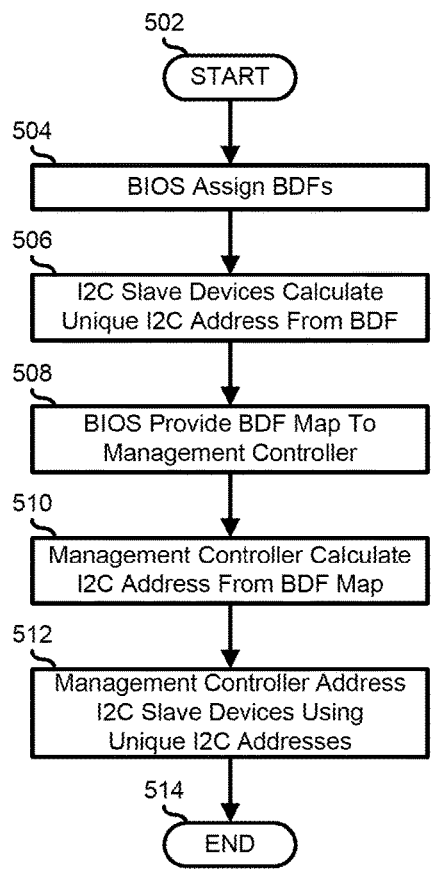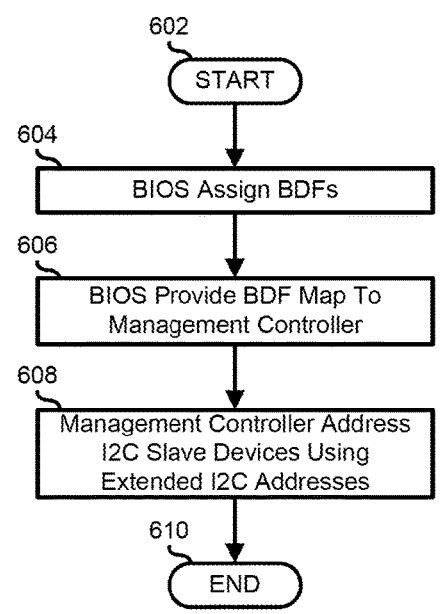
*FIG. 5*
*FIG. 6*

SYSTEM AND METHOD TO AVOID SMBUS ADDRESS CONFLICTS VIA A BASEBOARD MANAGEMENT CONTROLLER

CROSS-REFERENCE TO RELATED APPLICATION

This application is a continuation of U.S. patent application Ser. No. 14/658,553 entitled " System and Method to Avoid SMBus Address Conflicts via a Baseboard Management Controller," filed on Mar. 16, 2015, which is soon to issue as U.S. Pat. No. 9,940,275 the disclosure of which is hereby expressly incorporated by reference in its entirety.

FIELD OF THE DISCLOSURE

This disclosure generally relates to information handling systems, and more particularly relates to a system and method to avoid SMBus address conflicts via a baseboard management controller.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 5 is a flowchart illustrating a method of calculating unique I2C addresses based on a device's Bus/Device/Function (BDF) to address I2C slave devices according to an embodiment of the present disclosure;

FIG. 6 is a flowchart illustrating a method of using an extended address format including I2C slave device BDFs to address I2C slave devices according to an embodiment of the present disclosure;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
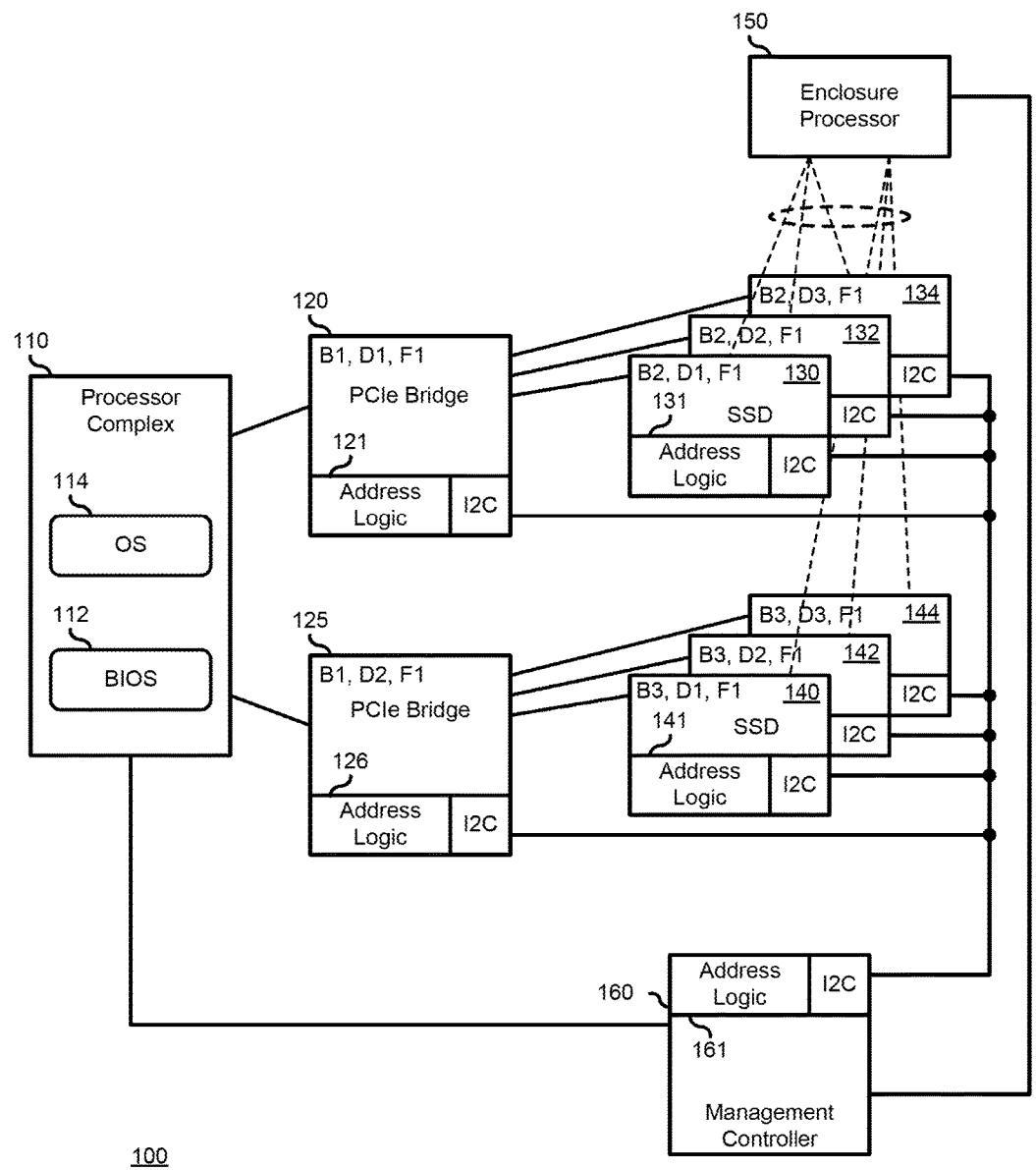
FIG. 1 is a block diagram illustrating an information handling system according to an embodiment of the present disclosure.

FIG. 1 illustrates an embodiment of an information handling system 100. For purpose of this disclosure information handling system 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a processor complex 110, Peripheral Component Interconnect—Express (PCIe) bridges 120 and 125, solid state drives (SSDs) 130, 132, 134, 140, 142, and 144, an enclosure processor 150, and a management controller 160. Processor complex 110 represents a processing system that performs the core computational functions of information handling system, and can include one or more CPUs, chipset input/output (I/O) components, volatile and non-volatile memory components, and other components, as needed or desired. In particular, processor complex 110 operates to store and retrieve information on SSDs 130, 132, 134, 140, 142, an 144.

Processor complex 110 includes a basic input/output system (BIOS) 112, and an operating system (OS) 114. BIOS 112 operates to initialize and maintain the basic functionality of information handling system 100. In particular, BIOS 112 operates to initialize functions and features of information handling system 100 that are connected to processor complex 110 via one or more PCIe links (illustrated as fine pitched solid lines), during a PCI-discovery phase of the boot up process for the information handling system. Specifically, BIOS 112 operates to discover PCIe bridges 120 and 125, and SSDs 130, 132, 134, 140, 142, and 144. For example, processor complex 110 is connected via a PCIe link to PCI bridge 120, and BIOS 112 can assign the PCIe bridge to operate as, and to respond to operations targeted to a particular PCIe Bus/Device/Function (BDF), here illustrated as B1, D1, and F1. For clarity, hereinafter, a particular BDF will be designated by a set of integers, such that the BDF for PCIe Bridge 120 is (1, 1, 1). Further, PCIe bridge 120 is connected via PICe links to SSDs 130, 132, and 134, and BIOS 112 can assign respective SSDs to operate as, and to respond to operations targeted to particular BDFs, such that SSD 130 is assigned BDF (2, 1, 1), SSD 132 is assigned BDF (2, 2, 1), and SSD 134 is assigned BDF (2, 3, 1).

Further, processor complex 110 is connected via a PCIe link to PCI bridge 125, and the PCIe bridge is connected via PCIe links to SSDs 140, 142, and 144, and BIOS 112 can assign the PCIe bridge to operate as, and to respond to operations targeted to BDF (1, 2, 1), and can assign respective SSDs 140, 142, and 144 to operate as, and to respond to operations targeted to particular BDFs, such that SSD 140 is assigned BDF (3, 1, 1), SSD 142 is assigned BDF (3, 2, 1), and SSD 144 is assigned BDF (3, 3, 1). After the boot up of information handling system 100 the devices on the PCIe links (PCIe bridges 120 and 125, and SSDs 130, 132, 140, 142, and 144) are addressed via their respective BDFs. In particular, a function that makes a call to a PCIe device can invoke a BIOS call to BIOS 112 that utilizes the device's BDF to identify the targeted device, or OS 114 can directly address device utilizing the device's BDF. In a particular embodiment, BIOS 112 represents an Extensible Universal Firmware Interface (uEFI).

Enclosure processor 150 represents a separate processing system of information handling system 100 that operates to manage the maintenance and operations of a backplane of the information handling system. In particular, enclosure processor 150 operates to determine whether or not a particular PCIe slot on the backplane is populated with a PCIe device. For example, information handling system 100 may include a backplane with 32 individual PCIe connectors, into which a user of the information handling system can install various devices such as SSDs 130, 132, 134, 140, 142, and 144, other devices like network I/O cards, storage interface cards, or other peripheral devices that are interfaced via a PCIe connector. Here, enclosure processor 150 can operate to determine that the PCIe connectors associated with SSDs 130, 132, 134, 140, 142, and 144 are populated with the respective SSDs. As such, enclosure processor 150 is illustrated as being connected to SSDs 130, 132, 134, 140, 142, and 144 via fine pitched dashed lines.

Management controller 160 represents another separate processing system of information handling system 100 that operates to manage the maintenance and operations of the information handling system that are not the core computational functions of information handling system that are performed by processor complex 110. For example, management controller 160 can maintain and operate the thermal and power functions of information handling system 100, can operate to maintain various elements of the information handling system, such as by performing firmware updates on the various elements, and can operate to configure the various elements through one or more out-of-band processing mechanism. An example of management controller 160 includes a processor that operates according to an Integrated Platform Management Interface (IPMI) specification, such as a Baseboard Management Controller (BMC), an Integrated Dell Remote Access Controller (iDRAC), or another management processor, as needed or desired.

Management controller 160 operates to provide configuration information to, to receive operational information from, and to otherwise control PCIe bridges 120 and 125, and SSDs 130, 132, 134, 140, 142, and 144. As illustrated, PCIe bridges 120 and 125, SSDs 130, 132, 134, 140, 142, and 144, and management controller 160 each include an Inter-Integrated Circuit (I2C) interface that is connected to a common System Management Bus (SMBus) that provides for the communication of management information between the devices connected to the SMBus. However, when devices that include an I2C interface are manufactured, the devices are typically programmed with to respond to a pre-set I2C address, such that all devices of a certain type that are from a common manufacturer have a common I2C address. This can lead to bus contention when a bus command is issued to an I2C address and multiple devices attempt to respond to the command.

In a particular embodiment, management controller 160 operates to receive status information on the operation of information handling system 100 from processor complex 110. In particular, management controller 160 operates to receive the BDFs for PCIe Bridges 120 and 125, and SSDs 130, 132, 134, 140, 142, and 144 from BIOS 112. For example, BIOS 112 can send the map of the BDFs for PCIe Bridges 120 and 125, and SSDs 130, 132, 134, 140, 142, and 144 via an IPMI OEM command, such as a Set Drive Mapping Query command. PCIe bridge 120 includes I2C address logic 121, PCIe bridge 125 includes I2C address logic 126, SSD 130 includes I2C address logic 131, SSD 140 includes I2C address logic 141, and management controller 160 includes I2C address logic 161. Similarly, each of SSDs 132, 134, 142, and 142 include I2C address logic. In this embodiment, the I2C address logic in each of the I2C slave devices (i.e., PCIe bridges 120 and 125, SSDs 130, 132, 134, 140, 142, and 144) operate to calculate a unique I2C address based upon the BDFs of the respective devices. For example, the unique I2C address can be calculated to encode the device's bus number in a first bit-field of the I2C address, the device's device number into a second bit-field of the I2C address, and the device's function number into a third bit-field of the I2C address, or the unique I2C address can be calculated by another algorithm, as needed or desired. Each I2C slave device then overrides the devices' pre-set I2C address, and replaces the pre-set I2C address with the devices' calculated unique I2C address. Further, I2C address logic 161 operates to map the unique I2C addresses of each of the I2C slave devices using the same algorithm as is utilized in the I2C slave devices. In this way, bus contention is eliminated on the I2C bus.

FIG. 5 illustrates a method of calculating unique I2C addresses based on the devices' respective BDFs to address I2C slave devices, starting at block 502. A BIOS of an information handling system discovers I2C slave devices on PCIe links and assigns a BDF to each discovered I2C slave device in block 504. Each I2C slave device calculates a unique I2C address based upon the device's assigned BDFs, and overrides the device's pre-set I2C address in block 506. The BIOS provides a BDF map of the I2C slave devices to a management controller in block 508. The management controller calculates the unique I2C address for each I2C slave device based upon each respective device's assigned BDF in block 510. The management controller addresses the I2C slave devices using the calculated unique I2C address in block 512, and the method ends in block 514.

Figure 2:
FIGS. 2 and 3 illustrate various extended address formats for addressing Inter-Integrated Circuit (I2C) slave devices according to various embodiments of the present disclosure.

In another embodiment, management controller 160 operates to receive the BDFs for PCIe Bridges 120 and 125, and SSDs 130, 132, 134, 140, 142, and 144 from BIOS 112. Here, the I2C address logic in each of the I2C slave devices (i.e., PCIe bridges 120 and 125, SSDs 130, 132, 134, 140, 142, and 144) operate to respond to I2C bus commands that have an extended address format that includes each device's respective pre-set I2C address, as appended with each device's respective assigned BDF. For example, PCIe bridge 125 can be programmed with a pre-set I2C address of 0xFF. In this case, when BIOS 112 assigns PCIe bridge 125 with the BDF (1, 2, 1), then the PCIe bridge can be configured to respond to I2C commands addressed to 0xff121. In this way, only PCIe bridge 125 will respond to I2C commands addressed to 0xFF121, and any other device on the I2C bus that has been programmed with the pre-set I2C address of 0xFF will ignore such I2C commands. In this embodiment, I2C address logic 161 operates to receive the BDFs from BIOS 112, and to format addresses to each particular I2C slave device by appending the assigned BDF for each respective device to the pre-set I2C address for the device. In this way, bus contention is eliminated on the I2C bus. FIG. 2 illustrates an example of an extended address format according to this embodiment, including a pre-set I2C address field 200 and a BDF field 202.

Figure 3:

In yet another embodiment, management controller 160 operates to receive the BDFs for PCIe Bridges 120 and 125, and SSDs 130, 132, 134, 140, 142, and 144 from BIOS 112. Here, the I2C address logic in each of the I2C slave devices (i.e., PCIe bridges 120 and 125, SSDs 130, 132, 134, 140, 142, and 144) operate to respond at boot time to I2C bus commands that have an extended address format that includes a predetermined I2C address, such as 0xEF, as appended with each device's respective assigned BDF. In this embodiment, I2C address logic 161 operates to receive the BDFs from BIOS 112, and to format addresses to each particular I2C slave device by appending the assigned BDF for each respective device to the predetermined I2C address for the device. In this way, bus contention is eliminated on the I2C bus. FIG. 3 illustrates an example of an extended address format according to this embodiment, including a predetermined I2C address field 300 and a BDF field 302.

FIG. 6 illustrates a method of using an extended address format including I2C slave device BDFs to address the I2C slave devices, starting at block 602. A BIOS of an information handling system discovers I2C slave devices on PCIe links and assigns a BDF to each discovered I2C slave device in block 604. The BIOS provides a BDF map of the I2C slave devices to a management controller in block 606. The management controller addresses the I2C slave devices by appending each device's BDF to an address associated with the I2C slave device in block 608, and the method ends in block 610. The address associated with the I2C slave device can include the device's pre-set I2C address, or a predetermined I2C address.

In another embodiment, the mapping of BDFs can be fixed in BIOS 112 based upon the particular connector into which each I2C slave device is installed. Here, management controller 160 receives the mapping from BIOS 112, and also receives an indication from enclosure processor 150 as to which connectors are populated. For example, enclosure processor 150 can send the map of the populated connectors for PCIe bridges 120 and 125, and SSDs 130, 132, 134, 140, 142, and 144 via an IPMI OEM command, such as a Get System Storage Mapping Query command. In this way, I2C address logic 161 determines which I2C addresses are present in information handling system 100 by one of the above three embodiments: calculating unique I2C addresses based on the devices' respective BDFs, addressing each device using the device's pre-set I2C address as appended with the device's BDF, or addressing each device using a predetermined I2C address as appended with the device's BDF.

Figure 4:
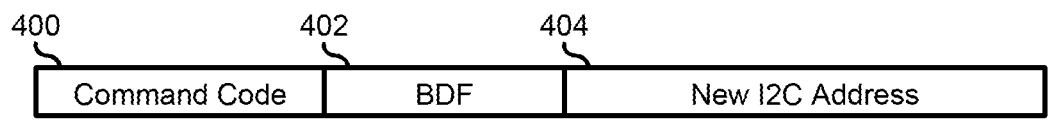
FIG. 4 illustrates a SET_ADDRESS I2C command according to various embodiments of the present disclosure.

In another embodiment, PCIe bridges 120 and 125, SSDs 130, 132, 134, 140, 142, and 144, and management controller 160 are configured to implement a SET_ADDRESS I2C command. The SET_ADDRESS I2C command includes a first field that provides a reference to the addressed device's BDF, and a second field that includes a new unique I2C address. Here, I2C address logic 161 operates maintain a pool of available I2C addresses and a map of assigned I2C addresses, and to issue the SET_ADDRESS command to each I2C slave device, assigning each I2C slave device with a unique I2C address from the pool of available I2C addresses. In this way, bus contention is eliminated on the I2C bus. Moreover, where one or more of PCIe bridges 120 and 125, and SSDs 130, 132, 134, 140, 142, and 144 are hot-pluggable, enclosure processor 150 provides an indication to management controller when a device has been removed, and I2C address logic 161 recovers the I2C address that had been assigned to the removed device. Similarly, when a device is installed, enclosure processor 150 provides an indication to management controller, and I2C address logic 161 issues the SET_ADDRESS command to the newly installed device with a newly allocated I2C address from the pool of available I2C addresses. FIG. 4 illustrates an example of a SET_ADDRESS I2C command according to this embodiment, including a command opcode field 400, a BDF field 402, and a new I2C address field 404.

Figure 7:
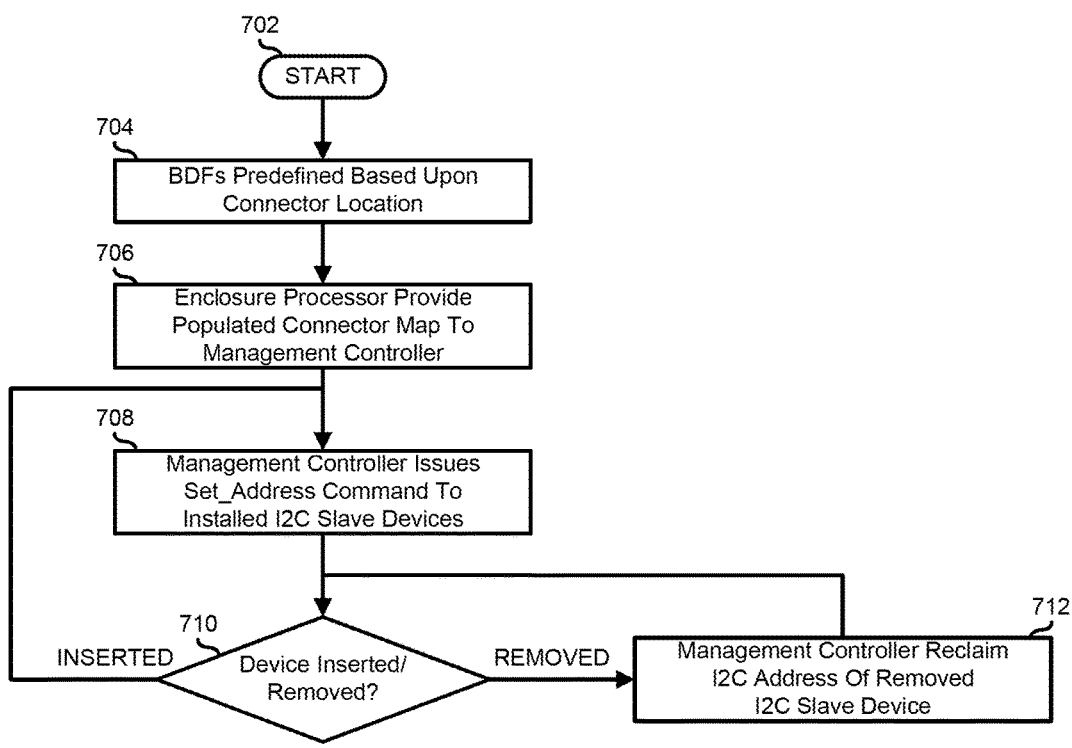
FIG. 7 is a flowchart illustrating a method of assigning I2C slave device addresses according to an embodiment of the present disclosure.

FIG. 7 illustrates a method of assigning I2C slave device addresses starting at block 702. In a particular information handling system, the BDFs for I2C slave devices that are installed into the connectors of the information handling system are predefined based upon the connector location in block 704. An enclosure processor of the information handling system provides a populated connector map to a management controller of the information handling system in block 706. The management controller issues a SET_ADDRESS command to each of the installed I2C slave devices in block 708. Each SET_ADDRESS command includes a unique I2C address for each of the I2C slave devices that is assigned from a pool of I2C addresses managed by the management controller. The method remains at decision block 710 until an I2C slave device is either inserted into a connector or removed from a connector. If an I2C save device is inserted into a connector, the "INSERTED" branch of decision block 710 is taken and the method returns to block 708, where the management controller issues a SET_ADDRESS command to the newly installed I2C slave device. If an I2C slave device has been removed from a connector, the "REMOVED" branch of decision block 710 is taken, the management controller reclaims the I2C address of the removed I2C slave device back to the pool of I2C addresses in block 712, and the method returns to decision block 710 to await a next installation or removal of an I2C slave device.

The embodiments and teachings as described above can be applied generally to I2C slave devices and I2C master devices. For example, an I2C slave device has access to seeding data that is unique to the I2C slave device, and the seeding data for a number of I2C salve devices can be provided to the I2C master device. The seeding data can then be used to generate unique I2C addresses for the I2C slave devices in systems and methods that are similar to the embodiments and teachings as described above. For example, an I2C slave device can be configured to use its seeding data to calculate a unique I2C address and the I2C master device can use a map correlating the seeding data for multiple I2C slave devices and, using a same algorithm, calculate the I2C addresses of the I2C slave devices. In another example, an I2C slave device can respond to an extended I2 address format that uses either the device's pre-set I2C address or a predefined I2C address, and that has the I2C slave device's seeding data appended thereto. In yet another example, an I2C master can be configured to provide, and and I2C slave device can be configured to receive, a command similar to the SET_ADDRESS command as described above.

In a particular embodiment, an I2C slave device that is not a PCIe device, and does not have a BDF, obtains a unique I2C address based upon other information related to the i2C slave device that is communicated to the associated I2C master device. For example, an I2C slave device can have a unique Field Replaceable Unit (FRU) code, a unique serial number, or be located on an information handling system in such a was as to obtain a unique identifier for the I2C slave device. Here, both the I2C slave device and the I2C master device derive the same unique I2C address for the I2C slave device by one of the above described mechanisms or methods. In this way, bus contention can be avoided on an I2C bus that includes I2C slave devices that are both PCIe devices and non-PCIe devices, as needed or desired.

Figure 8:
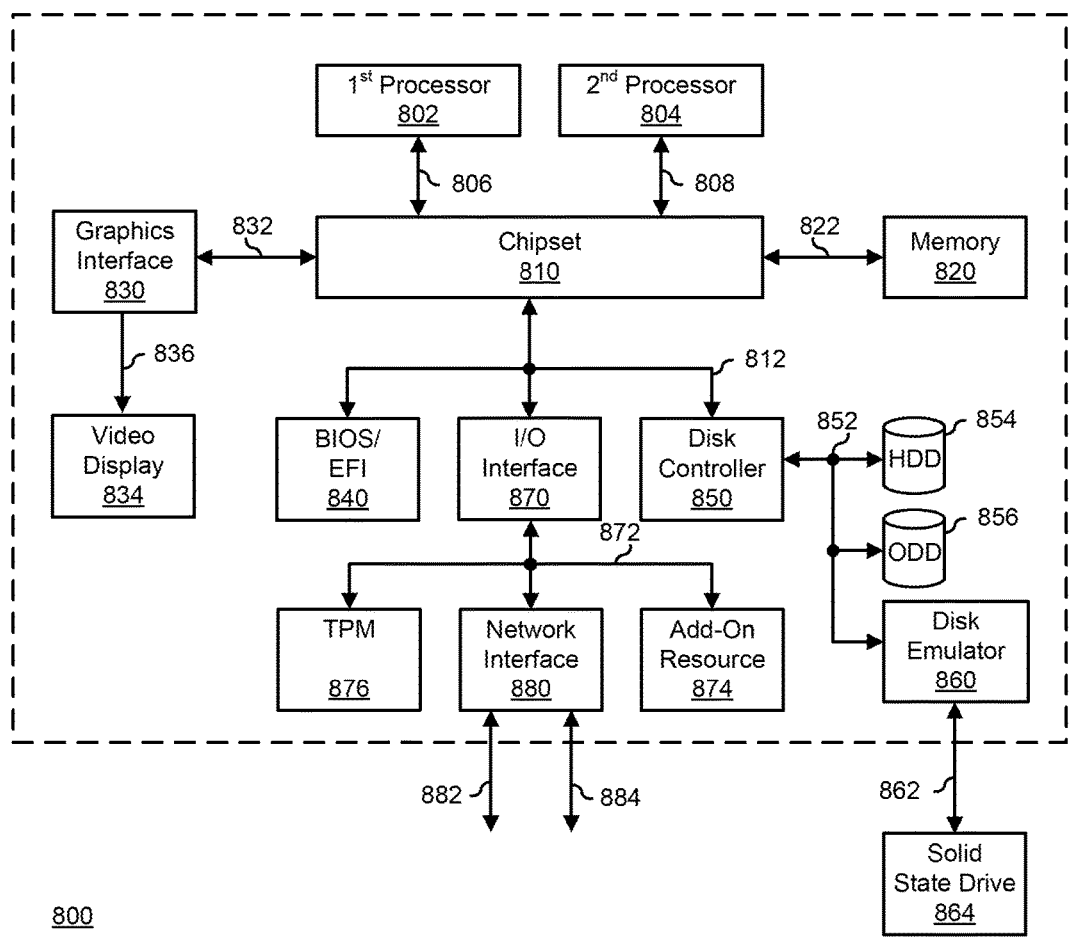
FIG. 8 is a block diagram illustrating a generalized information handling system according to an embodiment of the present disclosure.

FIG. 8 illustrates a generalized embodiment of information handling system 800. For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described above, and operates to perform one or more of the methods described above. Information handling system 800 includes a processors 802 and 804, a chipset 810, a memory 820, a graphics interface 830, include a basic input and output system/extensible firmware interface (BIOS/EFI) module 840, a disk controller 850, a disk emulator 860, an input/output (I/O) interface 870, and a network interface 880. Processor 802 is connected to chipset 810 via processor interface 806, and processor 804 is connected to the chipset via processor interface 808. Memory 820 is connected to chipset 810 via a memory bus 822. Graphics interface 830 is connected to chipset 810 via a graphics interface 832, and provides a video display output 836 to a video display 834. In a particular embodiment, information handling system 800 includes separate memories that are dedicated to each of processors 802 and 804 via separate memory interfaces. An example of memory 820 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 840, disk controller 850, and I/O interface 870 are connected to chipset 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 810 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 840 includes BIOS/EFI code operable to detect resources within information handling system 800, to provide drivers for the resources, initialize the resources, and access the resources. BIOS/EFI module 840 includes code that operates to detect resources within information handling system 800, to provide drivers for the resources, to initialize the resources, and to access the resources.

Disk controller 850 includes a disk interface 852 that connects the disc controller to a hard disk drive (HDD) 854, to an optical disk drive (ODD) 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits a solid-state drive 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O interface 870 includes a peripheral interface 872 that connects the I/O interface to an add-on resource 874, to a TPM 876, and to network interface 880. Peripheral interface 872 can be the same type of interface as I/O channel 812, or can be a different type of interface. As such, I/O interface 870 extends the capacity of I/O channel 812 when peripheral interface 872 and the I/O channel are of the same type, and the I/O interface translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as chipset 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An Inter-Integrated Circuit (I2C) slave device, comprising:
   an I2C interface; and
   I2C address logic;
   wherein the I2C slave device is configured with a pre-set I2C address, and receives seeding data that is unique to the I2C slave device and that is received via an address command from an I2C master device, wherein the I2C address logic responds to I2C commands addressed to an I2C slave address instead of to the pre-set I2C address, and wherein the I2C slave address is based upon the seeding data.

2. The I2C slave device of claim 1, wherein the I2C slave device performs a calculation on the seeding data to derive the I2C slave address.

3. The I2C slave device of claim 1, wherein the I2C slave address comprises an extended I2C address that includes the seeding data.

4. The I2C slave device of claim 3, wherein the extended I2C address further includes the pre-set I2C address.

5. The I2C slave device of claim 3, wherein the extended I2C address further includes a predetermined I2C address.

6. The I2C slave device of claim 1, wherein the I2C slave device further receives an address command.

7. The I2C slave device of claim 6, wherein the address command includes the pre-set I2C address, and wherein the I2C slave device further replaces the pre-set I2C address with the I2C slave address in response to receiving the address command.

8. A method, comprising:
   configuring an Inter-Integrated (I2C) slave device with a pre-set I2C address;
   receiving, by the I2C slave device, an address command from an I2C master device, the address command including seeding data;
   configuring the I2C slave device with the seeding data; and
   responding, by the I2C device, to I2C commands addressed to an I2C slave address instead of to the pre-set I2C address, wherein the I2C slave address is based upon the seeding data.

9. The method of claim 8, further comprising:
   performing, by the I2C slave device, a calculation on the seeding data to derive the I2C slave address.

10. The method of claim 8, wherein the I2C slave address comprises an extended I2C address that includes the seeding data.

11. The method of claim 10, wherein the extended I2C address further includes the pre-set I2C address.

12. The method of claim 10, wherein the extended I2C address further includes a predetermined I2C address.

13. The method of claim 8, further comprising:
   receiving, by the I2C slave device, an address command.

14. The method of claim 13, wherein the address command includes the pre-set I2C address, the method further comprising:
   replacing, by the I2C slave device, the pre-set I2C address with the I2C slave address in response to receiving the address command.

15. An Inter-Integrated Circuit (I2C) master device, comprising:
   an I2C interface; and
   I2C address logic;
   wherein the I2C master device transmits seeding data that is unique to an I2C slave device to the I2C slave device, wherein the I2C address logic addresses I2C commands to an I2C slave device using an I2C slave address instead of a pre-set I2C address associated with the I2C slave device, and wherein the I2C slave address is based upon the received seeding data.

16. The I2C master device of claim 15, wherein the I2C address logic further:
   selects the I2C slave address from a pool of I2C addresses; and
   provides an address command to the I2C slave device.

17. The I2C master device of claim 16, wherein the address command includes the seeding data and the I2C slave address.

18. The I2C master device of claim 16, wherein the I2C address logic further performs the calculation on the seeding data to derive the I2C slave address.

19. The I2C master device of claim 15, wherein the I2C slave address comprises an extended I2C address that includes the seeding data.

20. The I2C master device of claim 19, wherein the extended I2C address further includes one of the pre-set I2C address and a predetermined I2C address.

* * * * *